United States Patent Office 3,030,179
Patented Apr. 17, 1962

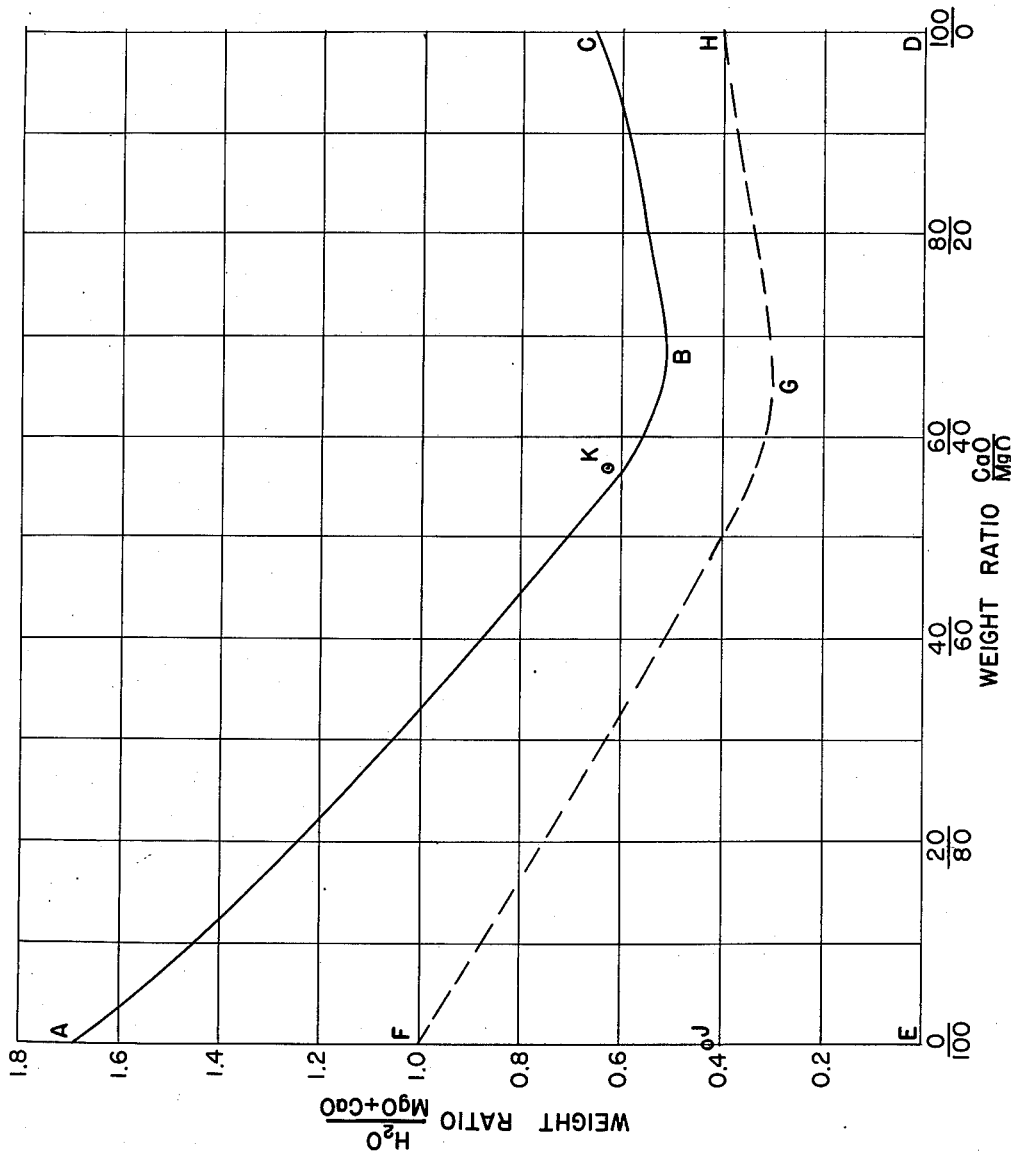

3,030,179
PRODUCTION OF AMMONIUM NITRATE COMPOSITIONS
Richard F. McFarlin, Lakeland, Fla., and Joseph G. Stites, Jr., Des Peres, Mo., assignors to Monsanto Chemical Company, St. Louis, Mo., a corporation of Delaware
Filed Aug. 18, 1958, Ser. No. 755,611
6 Claims. (Cl. 23—103)

The present invention relates to improvements in the production of ammonium nitrate compositions, and is especially applicable where it is required that the compositions be cast or used in a form in which the crystals are tightly compacted together.

At temperatures ranging from about $-18°$ C. to a phase transition occurring at about $30°$ C., the stable crystal form of ammonium nitrate is a rhombic bipyramidal form having a specific gravity of about 1.716. This form is generally designated by the Roman numeral IV. Between the $32°$ C. transition point and another one occuring at about $84°$ C., the stable crystal form is a rhombic form having a specific gravity of about 1.654. This form is generally designated by the Roman numeral III. Between the $84°$ C. transition point and one occurring at about $125°$ C., the stable crystal form is tetragonal and is designated by the Roman numeral II.

In the production and storage of compact forms of ammonium nitrate compositions, for example explosive or power gas generating charges, whether produced by casting or by compression, it has always been difficult to maintain the external form and internal structure of the compacted charge because of the discontinuous density changes that occur when the charge passes in either direction through the $32°$ C. transition temperature. As a result of such temperature changes, the compact ammonium nitrate compositions passing from one form to the other crack or crumble internally, and shrink or expand so as to part from or damage other objects which are supposed to remain in contact with the ammonium nitrate charge. This may lead to serious consequences in connection with the use of the charge: for instance, crumbling or cracking increases the burning surface of a power gas generating charge and hence the rate at which pressure is developed by it. The foregoing deleterious effects of physical disintegration are not limited to ammonium nitrate in explosives or other gas generating charges. On the contrary, prilled or granular fertilizer grade ammonium nitrate is also adversely affected, the prills, granules, etc. tending to break down to fine powders which more readily cake, swell, absorb moisture, etc.

Various additives have been proposed for counteracting the above physical disintegration of ammonium nitrate. Two additives which have been found to be particularly effective are magnesium nitrate and calcium nitrate, either alone or in combination; provided, however, that not more than a critical maximum of water is also present in the final product containing the magnesium nitrate and/or calcium nitrate. The critical maximum concentration of water is set forth in more detail in the accompanying drawing.

The drawing is a graph of the maximum permissible weight ratio of water to total of magnesium and calcium nitrates (expressed as the respective oxides), as a function of the weight ratio of calcium nitrate to magnesium nitrate (also expressed as the respective oxides) in the ammonium nitrate composition. As is apparent from the drawing, the critical maximum water concentration when utilizing calcium nitrate without magnesium nitrate is less than when using magnesium nitrate without calcium nitrate. When using a combination of calcium and magnesium nitrates containing about 70 weight percent CaO and about 30 weight percent MgO, the maximum permissible water ratio is even lower than when utilizing either of the additives alone. Thus, in practicing the present invention the process variables must be controlled in such a way that the $H_2O/CaO/MgO$ proportions fall within the area ABCDE of the drawing. Additionally, the total concentration of water in the ammonium nitrate product must be less than about 2 weight percent, and preferably less than about 0.5 weight percent. The water concentration can be readily measured by the Karl Fischer titration method.

The above-described stringent requirements with respect to water concentration in the ultimate ammonium nitrate composition makes it very difficult to produce such compositions by commercially feasible processes—principally because (1) magnesium nitrate and calcium nitrate hold water so tenaciously (e.g., magnesium nitrate hexahydrate loses only five of its six molecules of water even when heated as high as $330°$ C., and (2) ammonium nitrate is a very dangerous material to handle at even moderately high temperatures, e.g., greater than $200°$ C. Ammonium nitrate compositions containing the proper amount of additives and water have been made on a laboratory scale, for example, by separately dehydrating very finely ground solid ammonium nitrate and magnesium nitrate and then mixing the two together and fusing. However, on a commercial scale this procedure is impractical, not only because of the high expense of dehydrating solid ammonium nitrate, but also because of the lack of commercial availability of anhydrous magnesium nitrate.

As an alternative procedure, calcium and/or magnesium nitrates (either anhydrous or hydrated) were added to ammonium nitrate solutions which had been concentrated to about 95%, the solutions were then solidified by cooling, and the solidified compositions exposed to drying conditions (e.g., $60°-80°$ C.) in the hope of removing the rest of the water as it is removed in presently practiced commercial "prilling" processes. However, the presence of the calcium and/or magnesium nitrates in the solid ammonium nitrate makes removal of water in this manner practically impossible—probably because of the aforementioned strong tendency for the magnesium and calcium nitrates to hold water as water of hydration.

It has now been found, however, that when calcium and/or magnesium nitrates are in solution in molten ammonium nitrate, the necessary amount of water can be removed at temperatures which are not unduly dangerous insofar as explosibility of ammonium nitrate melts are concerned—i.e., temperatures in the range of $180°$ C.—$220°$ C. Consequently, it has now been found possible to produce stabilized ammonium nitrate compositions containing the appropriate amounts of water, calcium nitrate and/or magnesium nitrate described above by (1) forming a molten ammonium nitrate composition containing (a) either or both magnesium and calcium nitrates and (b) an amount of water greater than that covered by the area ABCDE of the accompanying drawing, then (2) evaporating the water from the aforesaid molten composition until the water content thereof is within that covered by the area ABCDE of the drawing and less than about 2 weight percent of the total ammonium nitrate composition, and thereafter (3) cooling said molten composition to a temperature below which it solidifies.

The molten ammonium nitrate composition (containing water, magnesium nitrate and/or calcium nitrate) from which the water is to be removed by evaporation, can be prepared in various ways. For example, one can start with solid ammonium nitrate (which may or may not already contain appreciable amounts of water), heat the ammonium nitrate to a temperature above its melting point, and then add calcium and/or magnesium nitrate hydrates (or solutions thereof) thereto. Alternatively, one may make ammonium nitrate from nitric acid and ammonia (e.g., as described in U.S. 2,739,036 or in U.S. 2,739,037) and then, while still in the heated molten stage, add appropriate amounts of calcium and/or magnesium nitrates thereto, either as the solutions, the hydrates or anhydrous salts. Another alternative involves making ammonium nitrate from nitric acid and ammonia as mentioned above, and then adding either or both magnesium oxide or calcium oxide to the molten ammonium nitrate. In this latter case, it is desirable to allow adequate time for reaction of the oxides with the molten ammonium nitrate to produce the corresponding magnesium and/or calcium nitrates, at least a part of which may be present as basic nitrates or similar closely related compounds resulting from possible side reactions other than simple formation of normal magnesium or calcium nitrates. Still another possibility for the formation of the molten ammonium nitrate composition from which water is to be evaporated involves the reaction of magnesium and/or calcium oxides, hydroxides, or salts (such as calcium or magnesium carbonate) directly with nitric acid to form solutions of calcium and/or magnesium nitrates in water or in aqueous nitric acid (depending upon the amount of excess nitric acid), and then introducing appropriate amounts of this solution into the reaction zone in which nitric acid and ammonia are reacted to form ammonium nitrate. The amounts of magnesium and/or calcium nitrates incorporated into the foregoing molten compositions will generally be equivalent to between about 0.02 and about 3 weight percent (preferably between about 0.1 and about 1.5 weight percent) MgO and/or CaO, based upon the ammonium nitrate content of the composition.

When the above-described molten compositions are prepared in relatively dilute form, concentration thereof to about 92–96% ammonium nitrate (or to a molar ratio of about 5 or 6 moles of $H_2O$ per mole of metal oxide) can be readily carried out by conventional ammonium nitrate concentration techniques—for example, at about 140° C. under about one-half atmosphere pressure or lower—in appropriate equipment such as a forced circulation vacuum concentrator. The removal of the remaining amounts of water, i.e., the last few percent, must be carried out at a somewhat higher temperature, somewhat lower pressure, and with somewhat greater care. This is generally done at temperatures ranging between about 170° C. and about 210° C. (preferably between about 180° C. and about 200° C.) and at pressures of below about 0.3 atmosphere (preferably below about 0.2 atmosphere). In this way the water content of the ammonium nitrate composition can be readily reduced to below 2.0 weight percent (or lower) of the total composition, and well within the area designated as ABCDE of the drawing. A preferred range of ultimate water content is that within the area designated as DEFGH of the drawing. While this final concentration step can be carried out in any conventional manner, it is advantageously carried out by evaporation from thin films or columns of liquid, whereby only relatively small proportions of the total amount of ammonium nitrate being processed are present at the higher temperatures at any given instant. Examples of typical equipment suitable for this latter type of evaporation are Rodney-Hunt "Turba-Film" evaporators, Swenson tubular evaporators, Pfaudler wiped film evaporators, etc.

The solidification of the foregoing concentrated ammonium nitrate composition containing the required concentrations of water and alkaline earth compound additives is readily effected by cooling the melt to a temperature below its melting point. This melting point will depend upon the ultimate water content as well as the kinds and amounts of other dissolved materials in the composition—an increasingly high melting point resulting from decreasing concentrations of water. For example, a composition containing about 5% water will melt at about 120° C., whereas a composition containing 0.2% water will melt at about 170° C. The solidification can be carried out by conventional means, such as by prilling, or quickly chilling in contact with cold surfaces, or pouring into molds and forming castings which are allowed to cool at any desired rate. The solid ammonium nitrate composition prepared in this manner need not be dried further (unless water is subsequently added thereto), although further drying will not be particularly detrimental.

The resulting product is effectively stabilized against disintegration during repeated temperature fluctuations through the 32° phase transition temperature. For example, a sample prepared by this process and analyzing 0.54% MgO, 0.23% $H_2O$, and remainder ammonium nitrate (point J on the drawing) was placed in an oven in which the temperature was cycled from 80° F. to 100° F. and back every eight hours. This sample withstood over 600 of the foregoing temperature cycles with no evidence whatsoever of physical degradation or disintegration.

In contrast thereto, a sample not made according to the present invention but containing 0.84% MgO, 1.1% CaO and 1.2% $H_2O$ (point K on the drawing) had begun marked physical disintegration after undergoing only 15 of the above-described temperature cycles.

The following specific embodiment of the present process is set forth as one of the best modes contemplated for carrying out this invention. One hundred pounds of anhydrous ammonia are reacted with 675 pounds of 55% aqueous nitric acid to give 555 pounds of 85% aqueous ammonium nitrate solution. This solution is then concentrated to a 95% solution by evaporating water therefrom at about 140° C. and about one-half atmosphere. Independently of the foregoing, 2.4 pounds of magnesium oxide are dissolved in 13.8 pounds of 55% nitric acid to form a solution of magnesium nitrate. This latter solution is filtered to remove any insoluble impurities and is then added to the aforementioned 95% ammonium nitrate solution to give about 512 pounds of ammonium nitrate solution containing 1.75% magnesium nitrate and about 6% water. This solution is passed rapidly through small diameter (e.g., 1 in.) tubes maintained at about 190° C., and is then allowed to flash into a chamber maintained at about 0.13 atmosphere pressure wherein water is vaporized from the composition to reduce the water content of the ammonium nitrate melt to about 0.3% $H_2O$. This concentrated molten ammonium nitrate is then prilled in a conventional manner by spraying it into a prilling tower in counter-current contact with ambient air, the solid ammonium nitrate being removed from the bottom of the tower at about 60–70° C.

It should be recognized that the practice of the present invention does not preclude the presence or addition of materials other than the magnesium and/or calcium nitrates described herein. For example, many of the materials conventionally added to or coated upon ammonium nitrate to reduce hydroscopicity or to enhance the flowability of the granular or prilled solids may also be used in conjunction with compositions produced by this invention. Typical examples of such materials are talc, diatomaceous earth, tricalcium phosphate, organic hydrocarbon or resinous coating agents, etc. Likewise other inorganic chemical agents can be added to the present ammonium nitrate compositions, as by adding such agents to the molten compositions before solidification thereof. For example, potassium nitrate has in the past often been added to ammonium nitrate in order to lower the temperature at which the transition from phase III to phase IV takes place. Likewise other plant nutrient materials such as phosphates and minor essential elements such as iron, copper, manganese, etc., have been added to ammonium nitrate in order to provide various multicomponent fertilizer compositions. Such materials can also be incorporated into or utilized with the product of the present invention without adversely affecting that product.

What is claimed is:

1. An improved process for preparing dimensionally stable ammonium nitrate which comprises (a) forming a molten $NH_4NO_3$ composition containing dissolved therein an alkaline earth metal nitrate selected from the group consisting of magnesium nitrate, calcium nitrate, and mixtures thereof, in an amount equivalent to between about 0.02 and about 3 weight percent, based upon the $NH_4NO_3$ content of the composition, of the corresponding alkaline earth metal oxide, and an amount of water greater than that covered by the area ABCDE of the drawing, (b) evaporating the water from said molten composition while maintaining said composition in the molten state and until the water content thereof is within that covered by the area ABCDE of the drawing and less than about 2 weight percent of the $NH_4NO_3$, and thereafter (c) cooling said molten composition to a temperature below which it solidifies.

2. The process of claim 1 wherein the water is evaporated from the molten composition until said water content is less than about 0.5 weight percent of the $NH_4NO_3$.

3. The process of claim 1 wherein the first molten $NH_4NO_3$ composition contains an amount of water greater than that covered by the area DEFGH of the drawing, and wherein said water is thereafter evaporated therefrom until the content is within the area DEFGH of the drawing.

4. An improved process for preparing dimensionally stable ammonium nitrate which comprises (a) forming a molten $NH_4NO_3$ composition containing dissolved therein magnesium nitrate in an amount equivalent to between about 0.02 and about 3 weight percent of magnesium oxide, based upon the $NH_4NO_3$ content of the composition, and an amount of water exceeding about 1.7 times by weight of the magnesium oxide equivalent of said magnesium nitrate, (b) evaporation of the water from said molten composition while maintaining the composition in the molten state and until the water content thereof is less than about 1.7 times by weight of the aforesaid magnesium oxide equivalent and less than about 2 weight percent of the $NH_4NO_3$, and thereafter (c) cooling said molten composition to a temperature below which it solidifies.

5. An improved process for preparing dimensionally stable ammonium nitrate which comprises (a) forming a molten $NH_4NO_3$ composition containing dissolved therein magnesium nitrate in an amount equivalent to between about 0.1 and about 1.5 weight percent of magnesium oxide, based upon the $NH_4NO_3$ content of the composition, and an amount of water greater by weight than the magnesium oxide equivalent of said magnesium nitrate, (b) evaporation of the water from said molten composition while maintaining the composition in the molten state and until the water content thereof is less than said magnesium oxide equivalent and less than about 0.5 weight percent of the $NH_4NO_3$, and thereafter (c) cooling said molten composition to a temperature below which it solidifies.

6. An improved process for preparing dimensionally stable ammonium nitrate which comprises (a) forming a molten $NH_4NO_3$ composition containing dissolved therein calcium nitrate in an amount equivalent to between about 0.1 and about 1.5 weight percent of calcium oxide, based upon the $NH_4NO_3$ content of the composition, and an amount of water exceeding about 0.65 times by weight of the calcium oxide equivalent of said calcium nitrate, (b) evaporation of the water from said molten composition while maintaining the composition in the molten state and until the water content thereof is less than about 0.65 times by weight of the aforesaid calcium oxide equivalent and less than about 0.5 weight percent of the $NH_4NO_3$, and thereafter (c) cooling said molten composition to a temperature below which it solidifies.

References Cited in the file of this patent

UNITED STATES PATENTS

| | | |
|---|---|---|
| 1,947,601 | Krauch et al. | Feb. 20, 1934 |
| 2,382,298 | Datin | Aug. 14, 1945 |
| 2,739,036 | Kamenjar et al. | Mar. 20, 1956 |
| 2,739,037 | Stengel et al. | Mar. 20, 1956 |

FOREIGN PATENTS

| | | |
|---|---|---|
| 573,147 | Great Britain | Nov. 8, 1945 |